United States Patent [19]
White

[11] Patent Number: 5,274,731
[45] Date of Patent: Dec. 28, 1993

[54] OPTICAL FIBER CABINET

[75] Inventor: Stephen D. White, Eden Prairie, Minn.

[73] Assignee: ADC Telecommunications, Inc., Minneapolis, Minn.

[21] Appl. No.: 996,708

[22] Filed: Dec. 24, 1992

[51] Int. Cl.$^5$ ............................ G02B 6/00; G02B 6/36
[52] U.S. Cl. ................................... 385/135; 385/134; 385/137; 385/139
[58] Field of Search ............... 385/134, 135, 136, 137, 385/140; 206/316.1, 557, 558, 561, 565

[56] References Cited

U.S. PATENT DOCUMENTS

| | | | |
|---|---|---|---|
| 4,776,662 | 10/1988 | Valleix | 385/137 X |
| 4,792,203 | 12/1988 | Nelson et al. | 385/135 X |
| 4,824,196 | 4/1989 | Bylander | 385/134 X |
| 4,840,449 | 6/1989 | Ghandeharizadeh | 385/135 X |
| 4,898,448 | 2/1990 | Cooper | 385/135 X |
| 4,941,720 | 7/1990 | Barwig et al. | 385/135 X |
| 5,024,498 | 6/1991 | Becker et al. | 385/134 X |
| 5,109,467 | 4/1992 | Hogan et al. | 385/135 |
| 5,127,082 | 6/1992 | Below et al. | 385/135 |
| 5,142,607 | 8/1992 | Petrotta et al. | 385/135 |
| 5,189,723 | 2/1993 | Johnson et al. | 385/134 |

OTHER PUBLICATIONS

Brochure for AT&T TM 41-Type Lightguide Interconnect Cabinet (LIC), 1989.

Brochure for Reliance Comm/Tec TM Fiber Optic Products, 1991.

*Primary Examiner*—Brian Healy
*Attorney, Agent, or Firm*—Merchant, Gould, Smith, Edell, Welter & Schmidt

[57] ABSTRACT

An optical fiber cabinet for enclosing various optical fiber connections and/or terminations. The optical fiber cabinet includes a frame which defines an optical fiber connection-termination area with the frame including a base having a bottom opening, vertical support members, and a removable upper frame member. Clam-shell doors are rotatably attached to the vertical support members of the frame and have a closed and open position. In the closed position, the clam-shell doors cooperate with the frame to enclose the optical fiber connection-termination area. In the open position, the clam-shell doors are disposed away from the optical fiber connection-termination area to allow both horizontal and vertical access to the optical fiber connection-termination area. A connection box within which the optical fiber connections are mounted is disposed within the optical fiber connection-termination area of the cabinet and includes a door rotatable between a closed and open position. The vertical support members of the cabinet are sized such that the connection box door is permitted to rotate substantially more than 90° between the closed and open positions when the clam-shell doors are in the open position.

7 Claims, 5 Drawing Sheets

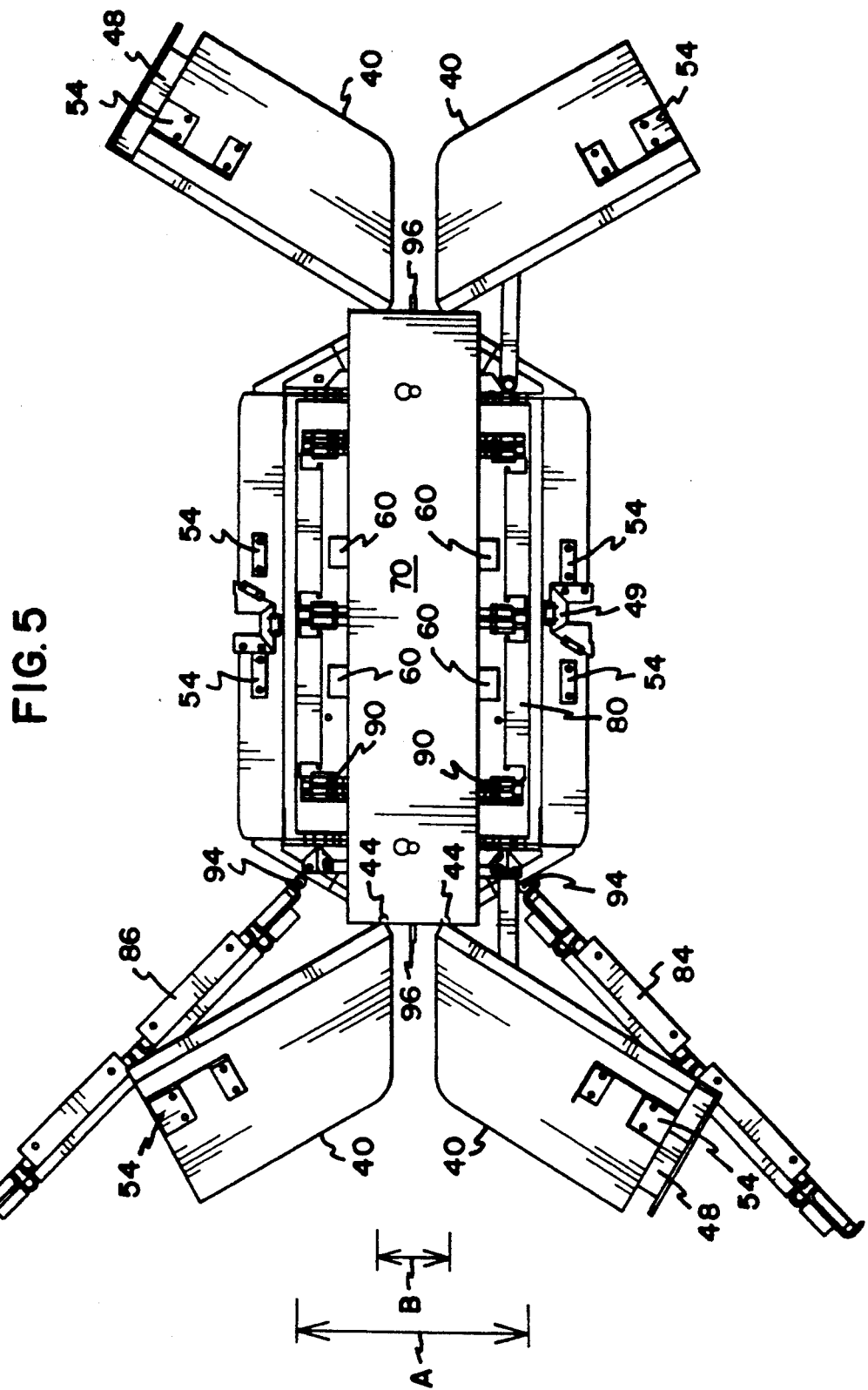

OPTICAL FIBER CABINET

FIELD OF THE INVENTION

This invention pertains to optical fiber cabinets. More particularly, the invention concerns a cabinet for enclosing optical fiber connections and/or terminations.

BACKGROUND OF THE INVENTION

In optical fiber communications systems, it is necessary to have various distribution stations where optical fiber cross-connections, interconnections, and terminations are performed. Often, these distribution stations are located in the field and it is necessary to provide a suitable enclosure for housing these distribution stations.

In pending application Ser. No. 07/816,558, now U.S. Pat. No. 5,189,723 an optical fiber enclosure is disclosed for underground housing of a distribution station.

Alternatively, a distribution station may be located above-ground with the optical fiber cables entering the distribution station from below ground. As known in the art, prior above-ground distribution stations have been enclosed by rectangular cabinets having vertical side doors which open to provide access to the distribution station located inside the cabinet. A typical cabinet known in the art is the AT&T TM 41-type light guide interconnect cabinet. A problem with these rectangular cabinets concerns the ability to access the interior of the cabinet when installing, repairing, or modifying the optical fiber connections located within the cabinet. These cabinets often only permit access to the interior of the cabinet from the front and the doors and top cover of the cabinet hinder the movement of a person working on the optical fiber connections within the cabinet.

Additionally, the optical fiber connections and/or terminations are often mounted within a connection box which is disposed within the cabinet. The connection box often has a hinged door which must be rotated outward to access the optical fiber connections inside. Typically, the side walls of a rectangular cabinet will prevent the connection box door from rotating substantially more than 90 degrees between the closed and open positions which further limits the accessibility to the optical fiber connections inside the connection box.

Several cabinets offer improved access to the cabinet by having L-shaped doors which permit access to the interior of the cabinet from the front and side. A typical cabinet is the CCPO enclosure manufactured by Reliance Comm/Tech TM. However, these cabinets still have an overhanging top cover which limits the accessibility of the interior of the cabinet.

An above-ground cabinet is needed for enclosing a distribution station of optical fiber connections which allows access to substantially the entire interior of the cabinet. The cabinet also should not hinder the movement of a person who is working on the optical fiber connections and/or terminations within the cabinet.

If the optical fiber connections are mounted within a connection box disposed in the cabinet, the cabinet should allow for rotation of the connection box door to an open position substantially outside the cabinet frame. The connection box door should be permitted to rotate substantially more than 90 degrees between the closed and open positions so that the connection box door does not inhibit the movement of a person working on the optical fiber connections within the connection box.

The top of the cabinet should also be removeable to allow for easy insertion, mounting or removal of the connection box.

Additionally, the cabinet should protect against natural elements (rain, insects or the like) and preferably would facilitate the runoff of water from the cabinet to increase the useful life of the cabinet.

SUMMARY OF THE INVENTION

In the preferred embodiment, an optical fiber cabinet is disclosed for enclosing various optical fiber connections and/or terminations. The optical fiber cabinet includes a frame which defines an optical fiber connection-termination area. The frame includes vertical support members, a removable upper frame member and a base having means for defining a bottom opening. Clam-shell doors are attached to the vertical support members of the frame and have a closed and open position. In the closed position, the clam-shell doors cooperate with the frame to enclose the optical fiber connection-termination area. In the open position, the clam-shell doors are disposed away from the optical fiber connection-distribution area to allow both horizontal and vertical access to the optical fiber connection-termination area. Additionally, means are provided for rotating the clam-shell doors between the closed and open positions.

In a preferred embodiment, the cabinet includes a connection box within which the optical fiber connections are mounted. The connection box is disposed within the optical fiber connection-termination area of the cabinet and includes a door which is rotatable between a closed and open position. The vertical support members of the cabinet are sized such that the connection box door is permitted to rotate substantially more than 90 degrees between the closed and open position when the clam-shell doors are in the open position.

Preferably, the clam-shell doors include a downward sloping upper portion to facilitate the runoff of water from the cabinet. The clam-shell doors and frame also preferably include means for sealing the cabinet to prevent natural elements from entering the cabinet. Additionally, means are provided for locking the cabinet doors in the closed position.

The above described features and advantages along with various other advantages and features of novelty are pointed out with particularity in the claims of the present application which form a part hereof. However, for a better understanding of the invention, its advantages, and objects obtained by its use, reference should be made to the drawings which form a further part of the present application and to the accompanying descriptive matter in which there is illustrated and described preferred embodiments of the invention.

BRIEF DESCRIPTION OF THE DRAWINGS

FIGS. 2 and 2A are a perspective view of the optical fiber cabinet shown in FIG. 1 with the clam-shell doors in the open position.

FIG. 5 is a top plan view of the optical fiber cabinet shown in FIG. 1 with the clam-shell doors and the connection box doors in the open position.

DETAILED DESCRIPTION OF THE PREFERRED EMBODIMENTS

Figure 1:
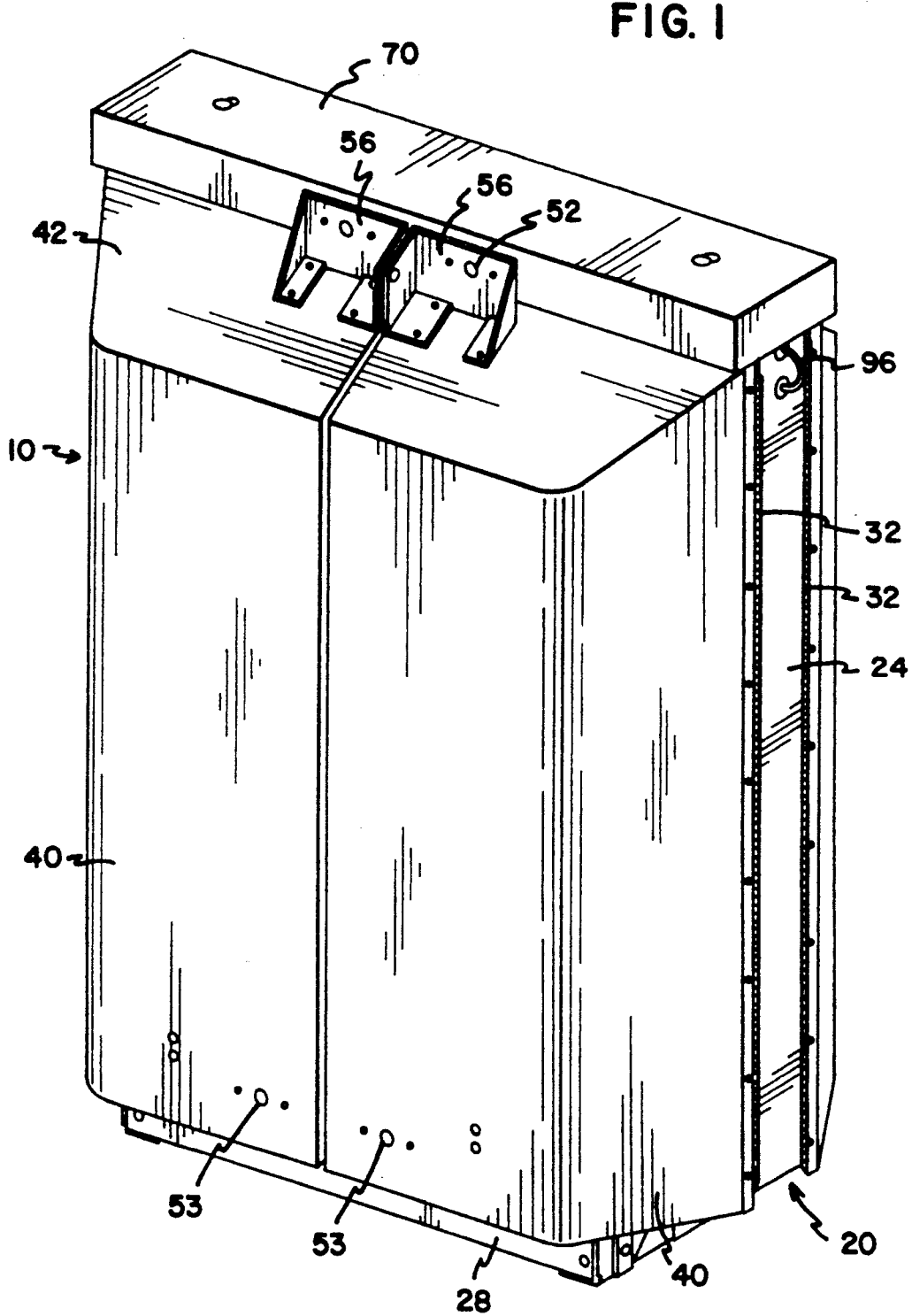
FIG. 1 is a perspective view of a preferred optical fiber cabinet with the clam-shell doors in the closed position.

Referring now to the drawings, in which similar elements are numbered identically throughout, a description of a preferred embodiment is provided. In FIG. 1, a perspective view of a closed optical fiber cabinet 10 is shown. The cabinet 10 is designed to enclose a variety of optical fiber cross-connections, inter-connections, splices, or terminations. In practice, the optical fiber cabinet 10 is preferably mounted outdoors, typically on a mounting block or ground sleeve. The optical fiber cables are run underground and are routed through an opening in the mounting block or ground sleeve up through the bottom of the cabinet 10 for mounting within the cabinet where the optical fiber splicing connections are performed.

The optical fiber cabinet includes a frame 20 defining an optical fiber connection-termination area 22. The frame 20 includes vertical support members 24, a removable upper frame member 26, and a base 28 having a bottom opening 30. A pair of clam-shell doors 40 are attached to each side of the vertical support members 24 through hinges 32. Referring to FIG. 5, the cabinet is generally symmetrical about a central axis 34 which runs between the vertical support members. Thus, the description of the features relating to a single clam-shell door is applicable to all of the clam-shell doors.

In the closed position as shown in FIG. 1, the clam-shell doors 40 are disposed such that the exterior edges of the doors 40 cooperate with the frame 20 to enclose the optical fiber connection-termination area 22. It will be appreciated that the adjacent edges of the frame and doors include appropriate channels 48 and gaskets 49 to seal the cabinet to prevent rain, insects and the like from entering the cabinet. Preferably, the upper portion 42 of each door slopes downward to facilitate the run-off of rain to increase the useful life of the cabinet 10.

The optical fiber cabinet 10 includes a mechanism for locking the clam-shell doors in the closed position. In the preferred embodiment, the locking mechanism 50 includes an upper and lower spring latch 52, 53 which is secured to each of the clam-shell doors 40 and corresponding latch catch members 54 which are secured to the upper frame member 26 and the bottom base 28. The upper spring latches 52 are mounted on latch brackets 56 which in turn are disposed on the upper portion 42 of each door 40. When the clam-shell doors 40 are in their closed position, the spring latches 52, 53 are disposed adjacent a corresponding latch catch member 54. To lock the door, the spring latch 52 which includes a cam member is rotated ¼ turn so that the cam member is rotated from a horizontal position to a vertical position. In this vertical position, the cam member engages the latch catch member 54 to lock the door 40 in place. The latch 52 includes a spring which serves to bias the cam member against the latch catch member to more firmly lock the door. It will be appreciated that various other types of latching mechanisms may be used to lock the clam-shell doors to the frame.

In the preferred embodiment, the optical fiber cabinet 10 includes door lift brackets 60 which are attached to the upper frame member 26. The door lift brackets 60 are positioned near the center of the upper frame member 26 and extend outward from the upper frame member 26 for engagement with the upper portion 42 of the clam-shell doors 40 when the doors are in the closed position. In this closed position, the door lift brackets 60 provide additional support for the doors 40 and ensure that the door and spring latches 52, 53 are in correct alignment with the latch catch members of the frame.

Figure 2:
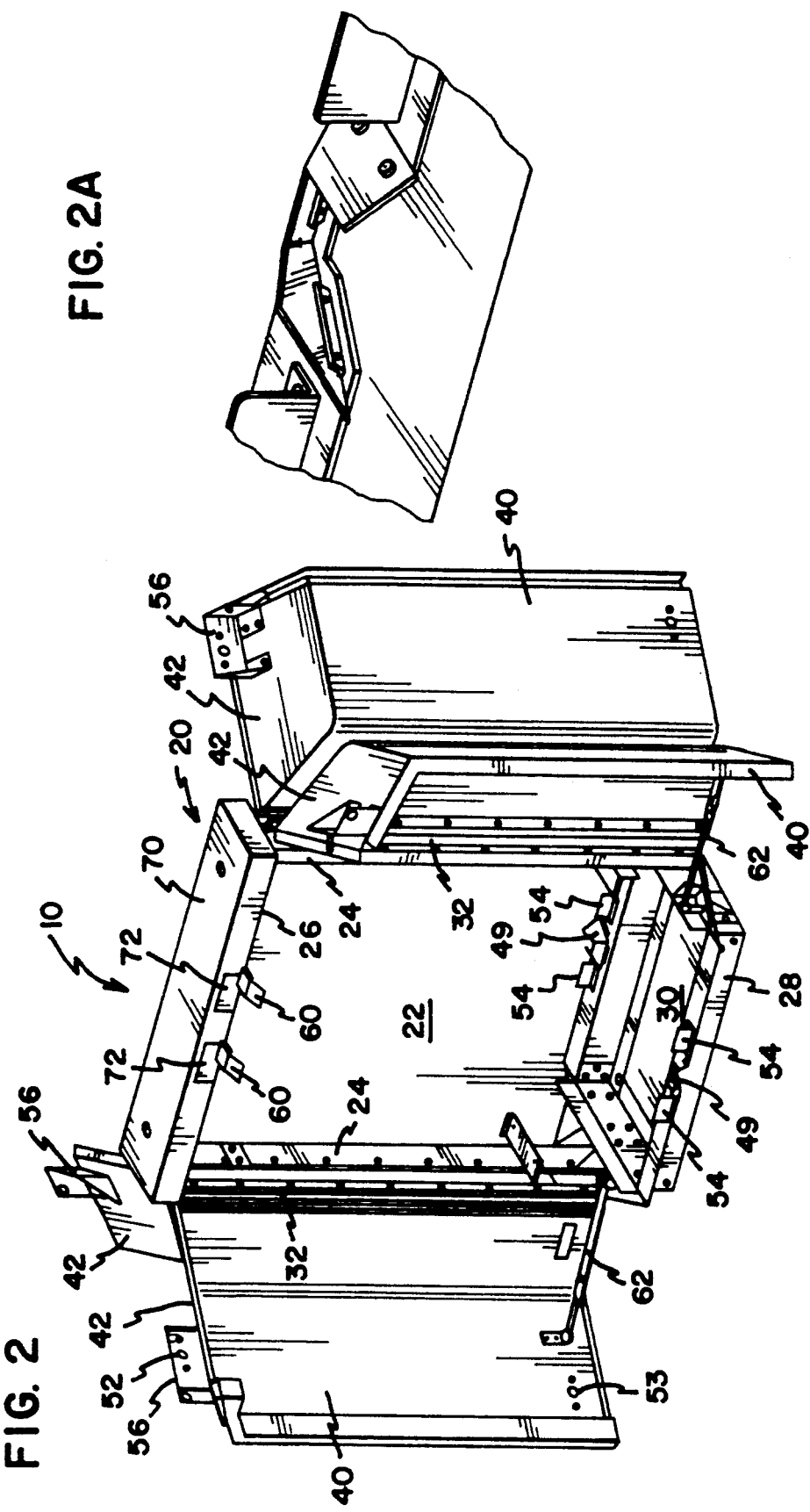

Pursuant to another feature of the invention, the clam-shell doors 40 open to an extended position to provide access to substantially the entire interior of the cabinet 10. As shown in FIG. 2, each clam-shell door 40 is rotatable through a hinge 32 to a position substantially away from the optical fiber connection-termination area 22. A doorstop 62 is attached between the bottom base 28 and inside of the clam-shell door 40 to limit the extension of the door. The doorstop 62 is hinged to allow the doorstop to fold together as a clam-shell door 40 is closed. It will be appreciated that in this open position, the optical fiber connection-termination area 22 in the interior of the cabinet 10 is readily accessible from nearly any orientation.

Figure 3:
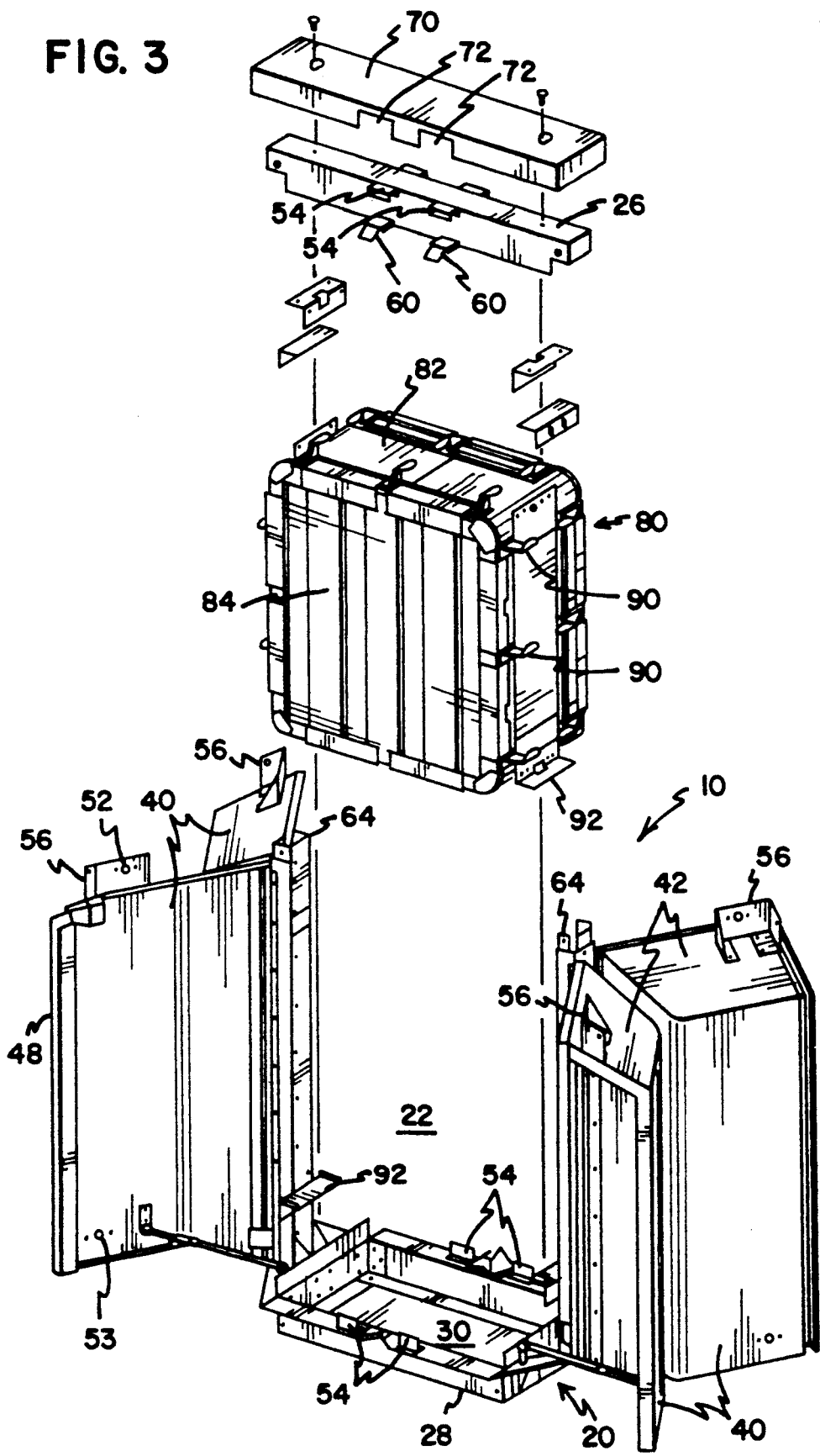
FIG. 3 is a perspective view of the optical fiber cabinet shown in FIG. 1 illustrating the mounting of the connection box within the cabinet.

Another feature providing additional access to the cabinet 10 is the removable upper frame member 26. As shown in FIG. 3, the upper frame member is attached between the vertical support members 24. Preferably, the upper ends of the vertical support members 24 include frame assembly brackets 64 for bolting the upper frame member 26 to the vertical support members 24. This permits the upper frame member 26 to be easily removed to allow greater access to the interior of the cabinet 10.

Referring to FIG. 3, a rain cover 70 is preferably provided to further shield the cabinet. The rain cover is attached to the top of the upper frame member 26 and includes openings 72 appropriately spaced to allow the spring latches 52 of the clam-shell doors 40 to engage the latch catch members 54.

The optical fiber cabinet 10 may accommodate a wide range of mounting assemblies in which various optical fiber splicing and terminating operations such as interconnecting and crossconnecting are performed. In a preferred embodiment, a connection box 80 which houses the optical fiber connections is provided for placement within the optical fiber connection-termination area of the cabinet. Referring to FIG. 3, the connection box 80 has a generally rectangular frame 82 and includes front and rear doors 84, 86 which are rotatable between a closed and open position. The doors 84, 86 are mounted to the frame 82 of the connection box 80 through hinges 88 and numerous latches 90 are provided to secure the doors to the frame 82. The bottom of the connection box 80 includes appropriate openings to permit the optical fiber cables to pass through into the interior of the connection box where the various optical fiber splicing operations are performed.

Figure 4:
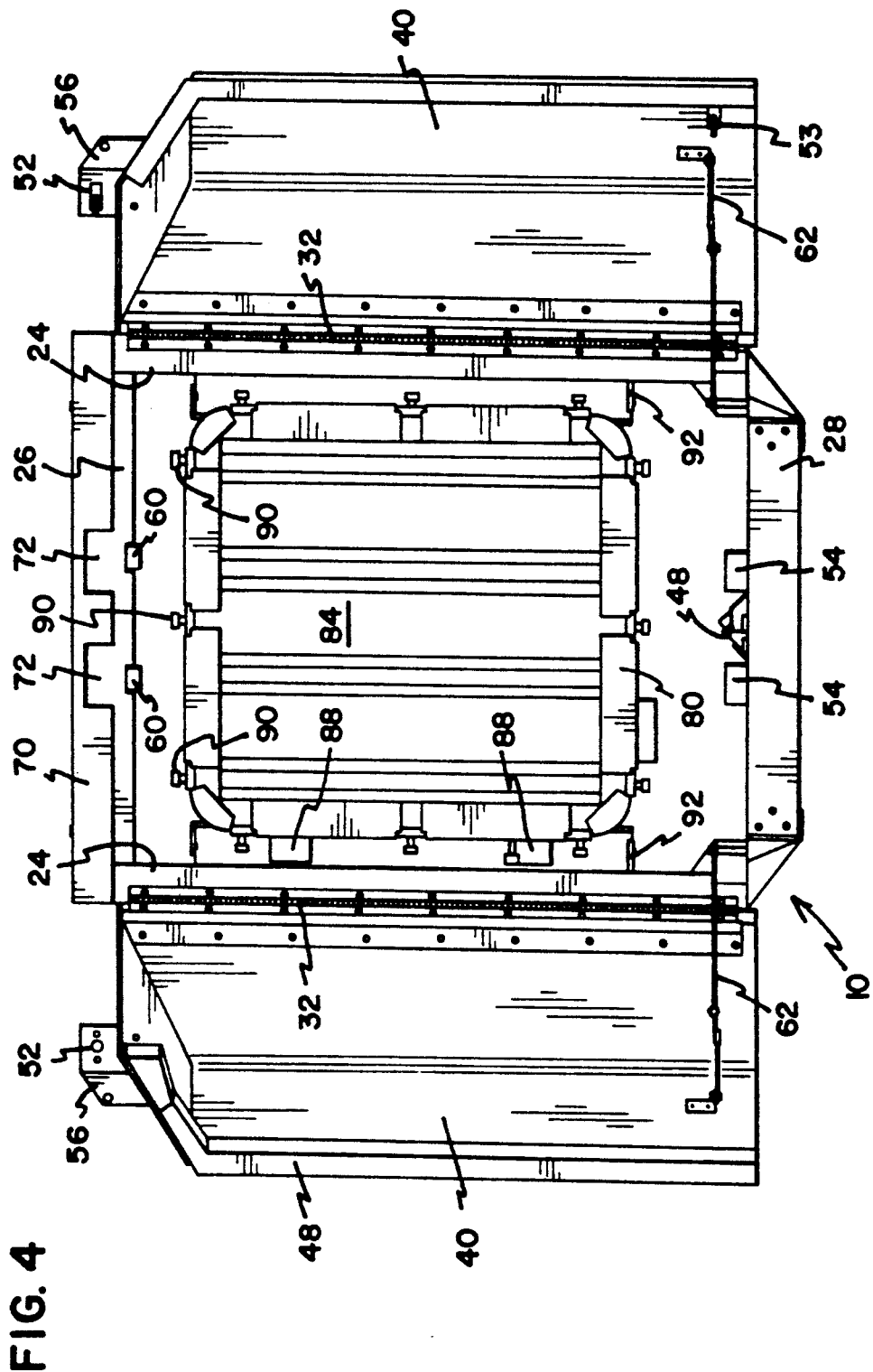
FIG. 4 is a side elevation view of the optical fiber cabinet shown in FIG. 1 with the connection box mounted within the cabinet.

As shown in FIGS. 3 and 4, the connection box 80 is sized to fit within the optical fiber connection-termination area 22 of the cabinet 10 between the vertical support members 24 of the frame 20. Appropriate mounting brackets 92 are attached to the connection box 80 and the vertical support members 24 to securely mount the connection box within the cabinet 10.

It will be appreciated that when the connection box 80 is disposed within the cabinet 10, the ability of the clam-shell doors 40 to rotate to an extended open position allows for greater accessibility to the connection box 80. A person wishing to repair or modify the connections inside the connection box 80 is not hindered by the cabinet doors 40 and can more efficiently complete the work required on the optical fiber connections within the box.

In a preferred embodiment, the connection box 80 and vertical support members 24 of the cabinet 10 are sized to allow the doors 84, 86 of the connection box to rotate to an open position substantially away from the optical fiber connection-termination area 22. As shown in FIG. 5, the width (A) of the connection box is greater than the width (B) of the vertical support members. This positions the pivot points 44 of the clam-shell doors closer to a central axis 34 of the cabinet than the pivot points 94 of the connection box doors 84, 86. With this alignment, the connection box doors 84, 86 are permitted to rotate substantially more than 90° from the closed position to an open position when the clam-shell doors 40 are in the open position, as shown in FIG. 5. With the doors 84, 86 of the connection box 80 able to rotate substantially beyond 90° to the open position, the interior of the connection box is easily accessible for a person working on the optical fiber connections within the box. Referring to FIGS. 4 and 5, when the clamshell doors 40 are in the open position, a person wishing to work on the optical fiber connections is permitted both vertical and horizontal access to the connection box 80 so that the latches 90 on the connection box 80 are readily accessible.

It will be appreciated that the connection box 80 may be preassembled with the various optical fiber splice connections/terminations mounted in the box 80 at a location remote from the cabinet. In such a case, the connection box 80 containing the optical fiber connections and having the optical fiber cables extending from the bottom of the box may then be transported to the location of the cabinet 10 for mounting within the cabinet. In such an operation, the clam-shell doors 40 of the cabinet are extended to the open position and the upper frame member 26 is removed. The connection box 80 is then lowered into the cabinet 10 with the fiber cables being routed through the bottom of the cabinet. The connection box 80 is mounted to the vertical support members 24 and then the upper frame member 26 is reattached to the vertical support members 24 to reassemble the cabinet. Throughout this process of mounting a presassembled connection box 80 in the cabinet 10, the clam-shell doors 40 are disposed substantially away from the interior of the cabinet and thus the doors 40 do not hinder the movement of the workers mounting the connection box 80 within the cabinet. This allows for a more efficient installation of a connection box within an optical fiber cabinet.

Referring to FIG. 1, the cabinet preferably includes support brackets 96 for lifting the cabinet. These lifting U-bolts 96 are secured to the upper exterior surface of each vertical support member 24 and facilitate easy lifting of the cabinet when the cabinet is installed in the field.

It is to be understood that even though numerous characteristics and advantages of various embodiments of the present invention have been set forth in the foregoing description, together with the details of the structure and function of various embodiments of the invention, this disclosure is illustrative only and changes may be made in detail, especially in matters of shape, size and arrangement of parts, within the principles of the present invention, to the full extent indicated by the broad general meaning of the terms in which the appended claims are expressed.

What is claimed is:

1. An optical fiber cabinet for enclosing a plurality of optical fiber connections and terminations, said cabinet comprising:

a frame defining an optical fiber connection-termination area, said frame including at least two vertical support members, a removable upper frame member releasably secured to the vertical support members, and a base having a bottom opening;

a plurality of clamshell doors attached to said vertical support members and having a closed position wherein said doors cooperate with said frame to enclose the optical fiber connection-termination area and an open position wherein said doors are disposed away from said optical fiber connection-termination area to allow vertical and horizontal access to said optical fiber connection-termination area; and means for rotating said doors between said closed position and said open position.

2. An optical fiber cabinet according to claim 1 wherein said optical fiber cabinet includes a connection box disposed within said optical fiber connection-termination area such that said plurality of optical fiber connections and terminations are mounted with said box, said connection box includes a frame, at least one door, and at least one pivot connection wherein the door is attached to the frame through the pivot connection for rotation between a closed position and an open position.

3. An optical fiber cabinet according to claim 2 wherein said vertical support members of the cabinet frame have a first width and said connection box frame has a second width such that said first width is less than said second width wherein said box door is permitted to rotate about said box pivot connection to a position substantially outside said optical fiber connection-termination area when said clam-shell doors are in the open position.

4. An optical fiber cabinet according to claim 3 wherein said connection box door is permitted to rotate substantially more than 90 degrees between said closed and open positions when said clam-shell doors are in the open position.

5. An optical fiber cabinet according to claim 3 wherein said connection box is sized to pass within said vertical support members when said removable upper frame member is removed.

6. An optical fiber cabinet according to claim 1 wherein said cabinet includes means for securing said clam-shell doors to said frame when the clam-shell doors are in the closed position.

7. An optical fiber cabinet according to claim 1 wherein said upper frame member includes door lift brackets which extend outward from the upper frame member to engage the clam-shell doors when the clam-shell doors are in the closed position.

* * * * *